Aug. 21, 1945.  R. HASKINS, JR  2,382,993
ERECTION DEVICE FOR GYRO VERTICALS
Filed Feb. 14, 1944  2 Sheets-Sheet 1

INVENTOR
ROBERT HASKINS, JR.
BY
ATTORNEY.

Aug. 21, 1945.  R. HASKINS, JR  2,382,993
ERECTION DEVICE FOR GYRO VERTICALS
Filed Feb. 14, 1944  2 Sheets-Sheet 2
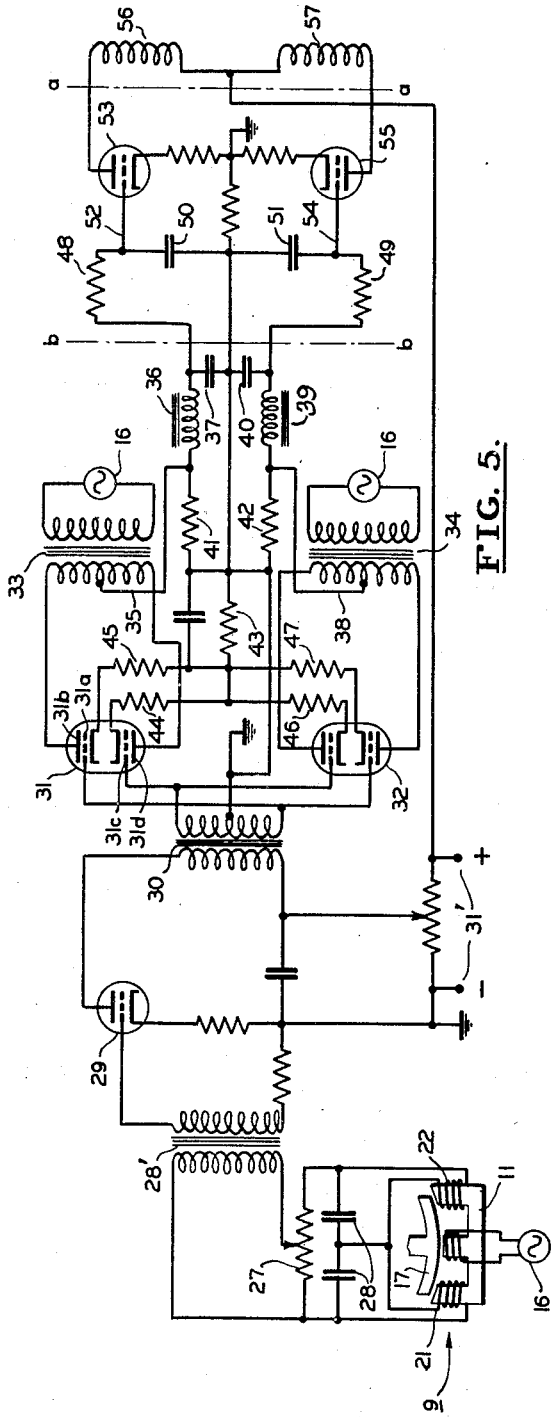
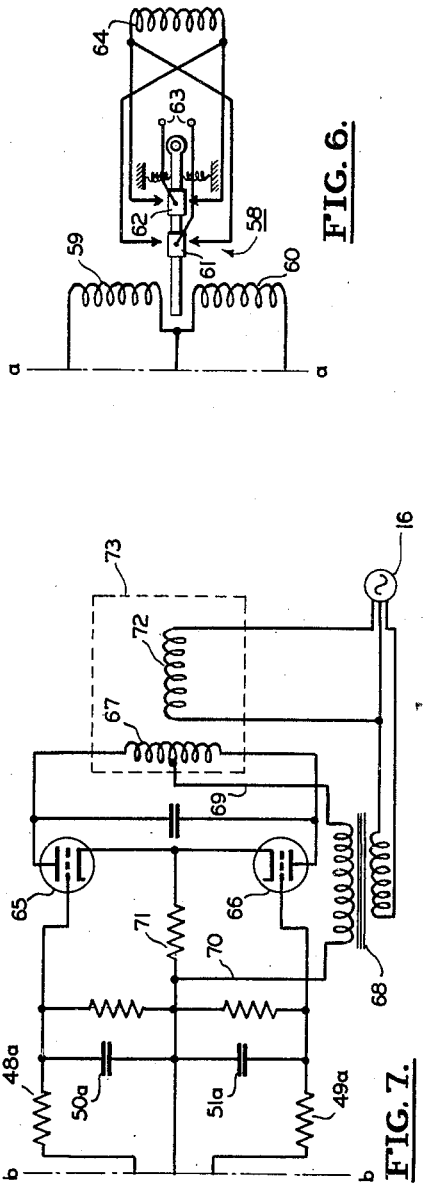
INVENTOR
ROBERT HASKINS, JR.
BY Herbert N Thompson
his ATTORNEY.

Patented Aug. 21, 1945

2,382,993

UNITED STATES PATENT OFFICE 2,382,993

ERECTION DEVICE FOR GYRO VERTICALS

Robert Haskins, Jr., Garden City, N. Y., assignor to Sperry Gyroscope Company, Inc., a corporation of New York Application February 14, 1944, Serial No. 522,362

9 Claims. (Cl. 74—5)

My invention particularly relates to a system for effecting precession of a gyro and to a gyro-erecting system which will provide precision control in the erection of a gyro vertical or, in other words, a precision vertical gyro.

Heretofore, it has been customary to employ pick-offs of a pendulous nature to provide signals or signal voltages which depend upon displacement between the vertical axis of the gyro and true vertical. These pendulous pick-offs are mounted to detect displacement between the vertical axis of the gyro and true vertical about the axes of support of the gyro and are designed to provide signals which will control the operation of a torque motor in a direction to move the axis of the gyro into coincidence with true vertical.

However, pendulous pick-offs or signal generators are subject to oscillations with the result that under some conditions and while the gyro actually precesses from a true vertical position, the signals derived from the pick-off will be of opposing characters or of opposite sign during consecutive half-cycles of the oscillations. This is due to the fact that the pendulum may oscillate to both sides of true vertical, and if the gyro is controlled for example by an on-off type of erection system, the rate of erection will be materially reduced.

Gyro verticals are normally subject to latitude error which is an error, if not corrected for, in the vertical reference provided by the gyro due to precession thereof occasioned by the earth's rotation. The rate of this precession, of course, varies with the position of the gyro instrument over the surface of the earth. The erecting system of a gyro vertical should, therefore, be designed to provide a normal erection rate at least equal to the precession rate of the gyro due to the earth's rotation so that such error cannot become accumulative. It has been determined that the normal erection rate of a vertical gyro is reduced to as low as one-eighth its value when carried on a plane flying in rough air. Under these conditions, the gyro cannot hold a true vertical reference when the normal erection rate is low as is desirable.

Accordingly, it is an object of the present invention to provide an erection system for a gyro vertical which is so constructed and arranged that it may provide a constant erection or precession of the gyro in a direction toward coincidence with vertical during oscillations of the signal pick-offs and which will at least maintain a rate of erection sufficient to overcome latitude error during oscillations of the pick-offs.

Another object resides in providing a gyro in which the gyro-precessing torque motor is controlled by a signal which is an integration of the error signals supplied by the signal pick-offs or signal generators.

It is another object of the present invention to provide an erection system for gyro verticals in which the signals derived from the pendulous pick-offs are integrated and the torque motors are controlled by the integrated signal, whereby to provide a precise erection control over the gyro.

Still another object resides in providing a gyro-erecting system in which the rate of precession will be substantially proportional to the integrated signal derived from the pick-offs; and in which control of the torque motor is of an on-off character and the direction of operation of the torque motor is dependent upon the average position of the pendulous pick-off during oscillations thereof.

With the foregoing and still other objects in view, my invention includes the novel elements and the combinations and arrangements thereof described below and illustrated in the accompanying drawings, in which—

Fig. 5 is a wiring diagram of a preferred form of erection control system embodying the present invention;

Fig. 6 is a wiring diagram of a modification of Fig. 5; and

Fig. 7 is a wiring diagram of a further modification.

In the following, I have described electrical pick-offs or signal generators and associated electrical amplifiers, integrators and torque motors controlled thereby as an exemplary and also a preferred embodiment of my invention; and it will be understood that other types of pick-offs, integrators, amplifiers and torque motors, such for example as those of a hydraulic, pneumatic or mechanical nature or any combination thereof, may be employed within the broad scope of the present invention.

Before proceeding with a detailed description of the preferred embodiments of the present invention, it is to be noted that an important feature of the present invention resides in the fact that the gyro-erecting means or its immediate control is not desensitized under oscillating conditions of the pendulous pick-off, and, furthermore, the erection torque is dependent on the integrated displacement between the gyro spin axis and the positions of the pendulous pick-off rather than on a pure displacement signal. In other words, the integrating circuit of the present invention provides an output which constantly indicates the average displacement and direction of the gyro off vertical, and thus the control signal on the torque motor is constant in direction, regardless of oscillations, until the gyro reaches vertical. Thus, the net torque applied in erecting the gyro is not diminished by oscillations of the pendulous pick-off, and the erection characteristics of the gyro will be free from latitude error.

Figure 1:
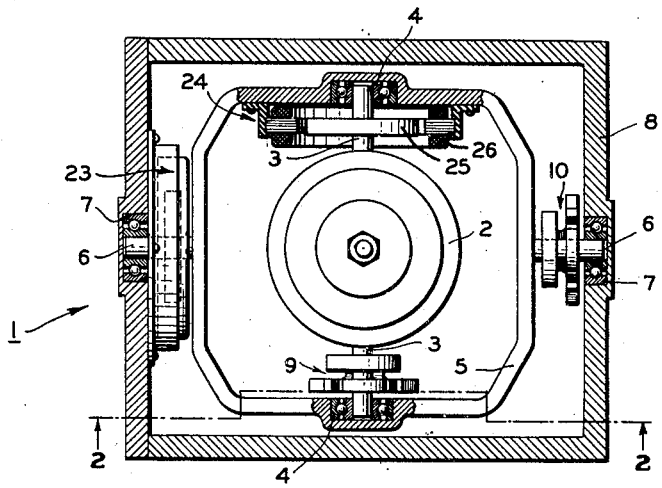
Fig. 1 is a sectional plan view of a gyro vertical instrument with some of the parts broken away and shown in section for illustrative purposes.
Figure 2:
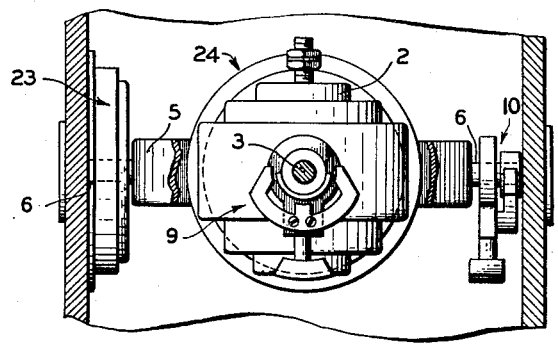
Fig. 2 is a fragmentary elevation view partly in section of the gyro instrument shown in Fig. 1, taken in about the plane 2—2 thereof.

Referring now to the drawings and first to Fig. 1, wherein an exemplary form of gyro vertical is illustrated, 1 represents generally the gyro comprising a rotor bearing case 2 within which the gyro rotor is adapted to spin about a vertical axis, normal to the plane of the paper as illustrated in Fig. 1. Rotor bearing case 2 is provided with trunnions 3 rotatably supported in suitable bearings 4 in the gimbal ring 5. Trunnions 3 define one of the preferably two mutually perpendicular axes of support about which the rotor and rotor bearing case of the gyro may pivot. The other axis of support is defined by trunnions 6 of the gimbal ring which are journaled in suitable bearings 7 in the casing 8 of the gyro instrument and serve rotatably to support the gimbal ring 5, the axes of trunnions 3 and 6 being shown as mutually perpendicular. For purposes of clarity in the drawings, I have not illustrated a complete gyro instrument, such as an artificial horizon or the like, but have shown only sufficient of the structure to illustrate the manner in which the gyro vertical may be supported and erected in accordance with the present invention.

For purposes of illustration, I have shown a pick-off of the pendulous type mounted on both axes of pivotal support for the gyro whereby respectively to provide a signal output dependent upon tilt of the gyro relative to vertical about these axes. A pick-off indicated generally at 9 is associated with the trunnions 3, and a similar pick-off 10 is associated with the trunnions 6. One preferred form of pick-off is illustrated more in detail in Figs. 3 and 4 and comprises a generally E-shaped core 11 of suitable magnetic material comprising preferably three legs 12, 13 and 14. An exciting winding 15 is disposed about the leg 14, connecting with a suitable source of alternating current 16 to provide a circulating flux simultaneously passing through the legs 12 and 13 of the core. An armature 17 of magnetic material is adapted to cooperate with the respective legs 12 and 13 of the core and to control the relative quantities of flux flowing therethrough. In the embodiment illustrated, the armature 17 is mounted on an insulating ring 18 which is secured to trunnion 3, and core 11 is supported on a yoke 19 which also is pivotally supported on trunnion 3. The armature 17 and its associated insulating base is fixed to rotate with the trunnion 3 and the rotor bearing case 2 of the gyro while the yoke 19, which is preferably formed of non-magnetic material, is adapted pendulously to pivot on trunnion 3, being provided with mass 20 which is fastened to the lower end thereof. In a similar manner, the parts of pick-off 10 may correspond to those above described of pick-off 9, and the component parts thereof may be similarly mounted on the trunnions 6.

Figure 3:
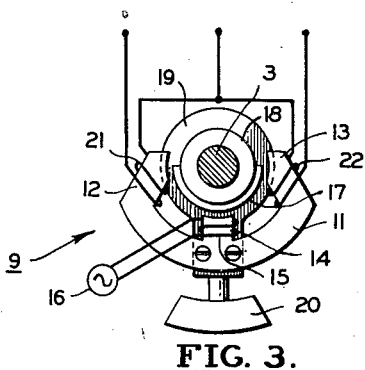
Fig. 3 is a detail view of one form of pendulous pick-off or signal generator.
Figure 4:
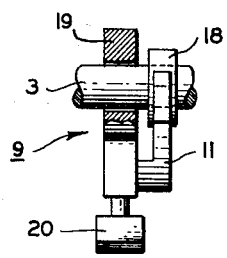
Fig. 4 is a fragmentary side elevation view of the pick-off of Fig. 3.

The exciting coil 15 of the pick-off serves to circulate flux through both legs 12 and 13 thereof with equal amounts passing through both legs when the armature 17 occupies the position shown in Fig. 3 wherein the reluctance of both branches of the magnetic circuit is substantially equal. However, when relative movement between the core 11 and armature 17 occurs, more flux will flow through one branch of the circuit and one of legs 12 or 13 than through the other, and, as a result, the voltage generated in the pick-off coils 21 and 22, respectively associated with the legs 12 and 13, will become unequal, thereby providing a resultant alternating voltage output of one phase sense or another, depending upon the direction of relative rotation of the core and the armature and of an amplitude depending upon the degree of such displacement.

Where electromagnetic pick-offs of the character above described are provided to detect tilt of the rotor bearing case about the two mutually perpendicular axes of support thereof as shown in Fig. 1, each thereof will ordinarily supply a voltage output dependent in magnitude on the degree of displacement between the vertical axis of the gyro and true vertical about the respective axes, assuming that the pendulous part of the pick-off is not subject to oscillations, and the signal voltages derived from these pick-offs are supplied to suitable control circuits, as hereinafter described, which in turn control the operation of the torque motors indicated generally at 23 and 24. The pick-off 9, of course, serves to control the direction of operation of torque motor 23 which is mounted and arranged to exert a torque about the axis defined by trunnion 6, while pick-off 10 controls the operation of torque motor 24 which is similarly mounted to exert a torque about the axis of trunnions 3.

For purposes of illustration, I have shown the torque motors 23 and 24 as comprising two relatively rotatable parts, one of which comprises field windings and the other of which comprises an Alnico disc, although other suitable types of torque motors may be employed, as will be evident from the following description of the amplifying and integrating circuits of the present invention. As shown in Fig. 1, torque motor 24 comprises the Alnico disc 25 which is mounted on and secured to rotate with trunnion 3 while the field coils 26 and associated core are secured to the gimbal ring 5 in concentric relation to the disc 25. The coils 26 may be designed as in accordance with one form of the present invention to receive direct current excitation to exert a torque on the permanent magnet disc 25 in one direction or the other, depending upon the direction of flow of current in said coils. The torque motor 23 may comprise two relatively rotatable, cooperable parts similar in all respects to torque motor 24 and, for this reason, has not been illustrated in section. The two parts of the torque motor 23 are, of course, fastened respectively to the gimbal ring 5 or trunnion 6 and the casing 8 of the gyro instrument. The torque motor 23 serves to erect the gyro about the axis of trunnions 3 in a well known manner, while torque motor 24 serves to erect the gyro about the axis of trunnions 6, the direction of the erection or precession of the gyro being dependent upon the direction of the torque applied by the torque motors and the operation of the torque motors in turn being dependent upon the sign or phase sense of the signals derived from the pick-offs.

In Fig. 5, I have illustrated a wiring diagram of a preferred form of amplifier and signal-integrating circuit for controlling the torque motors in accordance with an integration term of the signals derived from the pick-offs. In this figure the pick-off is indicated generally at 9 and the signal voltage-generating coils 21 and 22 thereof are shown connected in series, voltage bucking relationship and across resistor 27. Tuning condensers 28 may be connected across each of the signal-generating coils. The resistor 27 is employed as a potentiometer, whereby the desired order of magnitude of the signal voltages may be taken therefrom and supplied to the primary of transformer 28'. Transformer 28' serves to supply the signal voltage to a preferably linear stage of amplification, the secondary thereof being connected in the grid circuit of electron tube 29. The plate of tube 29 is connected through the primary of coupling transformer 30 to a source of plate potential indicated generally at 31'. Transformer 30 serves to supply the amplified signal to a full wave rectifier circuit which includes the two twin triodes 31 and 32. As illustrated, the signal voltage is applied simultaneously to the grids of the respective tubes and in phase opposition to the two grid elements of each tube. The plate potentials for the rectifier tubes are supplied from the source 16 of alternating current, which serves as a reference frequency for the rectifier circuit and renders it of a phase sensitive nature. For example, the primary of transformer 33 is connected across the source 16 and the secondary thereof has its opposite ends connected respectively with the two plates of tube 31. Similarly, the primary of transformer 34 is connected across the source 16 and its secondary is connected at opposite ends thereof respectively with the plates of tube 32. Each of the secondaries of the transformers 33 and 34 have a center tap connection through a suitable filtering circuit to output condensers which are connected to ground. For example, the center tap of the secondary of transformer 33 is connected through conductor 35 to a choke 36, the other end of the choke being connected to one side of condenser 37, the other side of which is preferably connected to ground as shown. The center tap of the secondary of transformer 34 is similarly connected through conductor 38 to choke 39, the other end of which is connected to condenser 40, having its other terminal connected to ground. The plate circuits of these tubes are also connected through resistors 41 and 42 respectively, resistor 43 and by-pass condenser, and the cathode resistors 44—45 and 46—47 respectively, to the cathodes of the respective tubes to complete the plate circuits thereof. The chokes 36 and 39 serve to filter out the A. C. plate current components whereby to apply D. C. potentials across the condensers 37 and 40.

It will be understood that in operation any change in the magnitude of the voltages supplied across condensers 37 and 40 will depend upon the direction of relative movement between the armature and core of the pick-off 9 and the magnitude of such displacement therebetween. When the armature 17 occupies a central position, wherein equal voltages are generated in the coils 21 and 22 of the pick-off, the voltages across the condensers 37 and 40 will be equal and cancel out. However, when relative movement between the armature and core of the pick-off results in a resultant signal voltage output, the voltages applied across condensers 37 and 40 will change in accordance with changes in the voltage signals supplied from the pick-off, and the resultant differential voltage across both condensers 37 and 40 will be dependent in magnitude upon the magnitude of relative displacement of the pick-off members and in sign upon the phase sense of the resultant alternating voltage signal.

The phase sensitiveness of the circuit is obtained by the use of the reference frequency from the source 16. Assume that a signal voltage of one-phase sense is amplified and supplied to the grid circuits of the rectifier tubes 31 and 32 in such manner that grid 31a of tube 31 becomes positive when its associated plate element 31b also receives a positive half-wave of alternating voltage from the source 16. Under these conditions, the tube 31 will conduct and a voltage will be impressed across the condenser 37. When the signal reverses, the grid 31c of tube 31 will become positive when a positive voltage half-wave is supplied to the plate 31d thereof. Hence, tube 31 will again conduct to impress a voltage across condenser 37 during the second half of the cycle. By applying similar assumptions in analyzing the operation of tube 32, to which plate voltages are supplied in phase opposition and signal voltages are applied to the grids thereof in phase opposition, it should readily be seen that, when the phase sense of the signal supplied thereto with respect to the reference voltages derived from the source 16, are, as above explained in connection with tube 31, the tube 32 will not conduct between either of the groups of tube elements therein. This is true because the grids thereof will become positive when the plates become negative. However, when the phase sense of the signal voltage reverses, both sides of the twin triode 32 will conduct, thereby providing full wave rectified voltages to the condenser 40. The tubes 31 and 32 may be arranged so that normally both conduct to provide equal voltages across the condensers 37 and 40 and upon application of alternating signal voltages to the grids thereof, as above described, the one tube will conduct more than the other tube, so that the voltages across the condensers 37 and 40 will differentially change in accordance with the phase sense of the signal voltage and the magnitude of the voltage differential thereacross will depend upon the displacement value between the armature and the core of the pick-off.

The voltages across condensers 37 and 40 are respectively applied to integrating networks, comprising respectively resistances 48 and 49 and condensers 50 and 51. The voltage across condenser 50 is supplied through conductor 52 to the grid of electron tube 53, and the voltage across condenser 51 is supplied through conductor 54 to the grid of electron tube 55. Tubes 53 and 55 function preferably as linear amplifiers to apply an amplified voltage respectively across the precessing coils 56 and 57, preferably proportional to the integration voltages on condensers 50 and 51.

The integrating, resistance capacitance networks serve to integrate the signal voltages supplied from the condensers 37 and 40 in the output of the full wave rectifier circuit, and the integration voltages appearing across the condensers 50 and 51 are respectively applied to the grids of tubes 53 and 55. The integrating circuits preferably have a long time constant, so that they may integrate the signal voltage outputs of the rectifying circuit and provided a signal voltage which is substantially proportional to the average of the signal voltages derived from the pick-off or to the average displacement between the vertical axis of the gyro and true vertical. Obviously, the time constant should not be too long or of such magnitude as to produce undesirable hunting.

In the embodiment shown in Fig. 5, the integration signals are supplied to the amplifier tubes 53 and 55 and the outputs of these tubes fed directly to precessing coils 56 and 57 respectively. These coils may be the field coils of D. C. torque motors or any electrically equivalent coils, such as those which generate magnetic fields and which, for example, react on permanent magnets, and the like. In this case, the current in the torque motors or the torque exerted thereby is proportional to the integrated signal. On the other hand, the coils 56 and 57 may be the field coils of a relay as shown in Fig. 6, the relay controlling the direction of the flow of either A. C. or D. C. current to a torque motor, and in this latter case, the torque will be of a constant value depending in direction upon the sign of the resultant signal derived from the output of the integrating amplifier.

In Fig. 6, the relay indicated generally at 58 comprises the opposed field windings 59 and 60, which are adapted to be connected to the output of tubes 53 and 55 of Fig. 5 in the manner shown, that is to say, the circuit of Fig. 6 may be substituted for that portion of the circuit of Fig. 5 appearing to the right of the dot-dash line a—a. In the exemplary showing, the armature of relay 58 comprises conducting segments 61 and 62 which respectively are connected to opposite sides of a source of electrical energy 63, which may be of an alternating or direct current character. The contacts of the relay are adapted to engage suitable fixed contacts which are connected in circuit with coil 64. With this arrangement, the resultant output of the integrating amplifier will cause the armature of the relay to move in one direction or the other, whereupon the armature of the relay will connect the coil or winding 64 across the source of energy in one-phase sense or polarity sense or the other, depending upon the resultant sign or polarity of the excitation of the field windings of the relay. The winding 64 may be a coil arranged to provide a magnetic field, as explained in connection with the coils 56 and 57 of Fig. 5, or it may constitute a field winding of a D. C. or A. C. torque motor.

In Fig. 7, I have shown a modified arrangement for controlling an A. C. torque motor in accordance with the present invention. It will be understood that the circuit of Fig. 7 may be substituted for that part of the circuit of Fig. 5 appearing to the right of the dot-dash line b—b. In other words, the signal voltage output of the full wave rectifier circuit or the voltages appearing across the condensers 37 and 40 are respectively applied to the integrating networks comprising the resistances 48a, 49a and condensers 50a and 51a. The integration voltages across the condensers 50a and 51a are supplied to the grids of electron tubes 65 and 66 respectively. The plates of these tubes are connected respectively to opposite ends of a field winding 67 and an alternating potential is applied across these tubes through the medium of transformer 68, the primary of which is connected across one phase of a three-phase alternating current source and the secondary of which is connected at one end through conductor 69 to a center tap on coil 67, and at the other end through conductor 70 and resistor 71 to the cathodes of the two tubes. The function of this circuit is to supply an alternating current or a resultant alternating current in the coil or winding 67, which is of a phase sense depending upon the polarity sense of the resultant of the two D. C. voltages across the condensers 37 and 40 or the input to the circuit. Coil or winding 72 represents one phase of a two-phase A. C. torque motor 73, while the winding 67, above described, represents the other phase thereof. Since the winding 72 is constantly energized through its connection across one phase of the three-phase supply, the torque motor will operate when alternating current is supplied to the other phase 67 thereof and the current supplied to the winding 67 will always be 90° out of phase with the current supplied to the winding 72, but it may experience a 180° phase reversal when the resultant polarity of the D. C. signal across condensers 37 and 40 reverses. Hence, the torque motor 73 will operate when a resultant integration signal voltage is supplied to the circuit of Fig. 7, and the direction of operation thereof will depend upon the polarity sense of said signal voltage.

From the foregoing, it should be evident that, with a gyro erection system of the character herein contemplated, wherein the torque motor output is proportional to the average displacement between the spin axis of the gyro and vertical or is of a constant value in one direction or the other, depending upon the sign of the output signal from the integrating amplifier, the net torque applied in erecting the gyro is not diminished at any time by oscillations of the pendulous pick-offs. Furthermore, the output of the integrating amplifier can be made proportional to the average displacement between the gyro spin axis and the position of the pendulum and thus furnishes a measure of latitude error when the erection torque is proportional to this signal.

Additionally, it will be understood that although I have described my invention and illustrated the various embodiments thereof in association with a gyro vertical, it may likewise be employed in controlling precession of any gyro or gyroscopic instrument about any axis thereof, where the pick-offs, supplying a control signal which is a measure of displacement between an axis of the gyro and some reference axis, may be subjected to oscillations or variations of an oscillatory nature.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro-precessing system, a gyroscope, means for providing a signal upon relative movement between the spin axis of said gyroscope and a reference axis, means for integrating said signal whereby to provide a signal dependent upon the average displacement between said spin and reference axes, and means responsive to the latter signal for precessing said gyroscope.

2. In a gyro-erecting system of the character described, a gyro-vertical, means associated with said gyro and responsive to gravity for providing a signal upon relative displacement between the spin axis of said gyro and the vertical reference provided by said means, means for integrating said signal whereby to provide a signal dependent upon the average displacement between said spin axis and vertical, and means responsive to the latter signal for precessing said gyro.

3. In a gyro-erecting system of the character described, a gyro-vertical including a rotor bearing case, means for supporting said case to pivot about two axes of support, means including an element pendulously mounted on one of said supporting axes as a vertical reference axis for providing a signal upon relative displacement between the spin axis of said gyro and said reference axis, means for integrating said signal, and means responsive to the integration signal for precessing said gyro.

4. In a gyro-precessing system, a gyroscope, means for providing an electrical signal voltage output having a magnitude dependent upon the angular displacement between the spin axis of said gyroscope and a reference axis, means for integrating said signal, and means responsive to the integration signal for precessing said gyroscope.

5. In a gyro-erecting system, a gyro-vertical, a pendulously supported reference member, means for providing an electrical signal voltage output having a magnitude dependent upon the angular displacement between the spin axis of said gyro and said reference member, an electrical circuit comprising resistance and capacitance for integrating said signal voltage, and a torque motor controlled by the integration signal voltage for precessing said gyro.

6. In a gyro-erecting system, a gyro-vertical, means for providing an A. C. voltage output having an amplitude and phase sense depending upon the magnitude and direction of angular displacement between the spin axis of said gyro and vertical, means for rectifying said signal voltage, means for integrating the rectified signal voltage, and means responsive to the integration signal voltage for precessing said gyro.

7. In a gyro-erecting system, a gyro-vertical, means including a pendulously supported reference member for providing an A. C. voltage output having an amplitude and phase sense depending upon the magnitude and direction of angular displacement between the spin axis of said gyro and said reference member, a signal voltage amplifier and rectifier including a resistance-capacitance network for integrating the rectified signal voltage, and means responsive to the integration signal voltage for precessing said gyro.

8. In a gyro-precessing system, a gyroscope, means for providing an electrical signal voltage having a magnitude dependent upon the angular displacement between the spin axis of said gyroscope and a reference axis, means for integrating said signal to provide a D. C. integration signal voltage, means for producing an A. C. voltage dependent in amplitude and phase sense upon the magnitude and polarity of said integration signal, and an A. C. torque motor controlled by said A. C. voltage.

9. The combination with a gyro-vertical including a rotor bearing case and means for supporting said case to pivot about two axes of support, of a member pendulously supported to pivot about one of said axes of support as a vertical reference, a torque motor mounted to exert a torque on said case about the other supporting axis, a pick-off associated with said pendulous member and gyro for providing an A. C. signal voltage output, an amplifier including phase-sensitive rectifying means for converting said A. C. signal voltage to a D. C. voltage signal and means for integrating said D. C. voltage signal, said amplifier means being connected in controlling relation to said torque motor.

ROBERT HASKINS, Jr.